United States Patent [19]

Nakagawa et al.

[11] Patent Number: 5,919,012
[45] Date of Patent: Jul. 6, 1999

[54] METHOD OF HIGH SPEED CUTTING MOLD AND ULTRA-HIGH SPEED MILLING MACHINE

[75] Inventors: Takeo Nakagawa; Masahiro Anzai; Ichiro Takahashi; Toshitaka Matsuoka, all of Wako, Japan

[73] Assignee: The Institute of Physical and Chemical Research (RIKEN), Wako, Japan

[21] Appl. No.: 08/720,009

[22] Filed: Sep. 27, 1996

[30] Foreign Application Priority Data

Sep. 28, 1995 [JP] Japan ................................ 7-250704

[51] Int. Cl.[6] ............................................ B23C 1/06
[52] U.S. Cl. ............................ 409/132; 409/80; 409/191
[58] Field of Search .............................. 409/80, 131, 132, 409/190, 191, 202

[56] References Cited

U.S. PATENT DOCUMENTS

| | | |
|---|---|---|
| 4,335,983 | 6/1982 | Wermeister et al. . |
| 4,599,022 | 7/1986 | Yamazaki ................................ 409/132 |
| 5,272,940 | 12/1993 | Diskin ..................................... 407/119 |
| 5,368,539 | 11/1994 | Mills et al. .............................. 409/132 |
| 5,429,460 | 7/1995 | Campian ................................. 409/202 |
| 5,486,072 | 1/1996 | Green ..................................... 407/119 |
| 5,575,099 | 11/1996 | Strobel et al. .......................... 409/191 |
| 5,580,196 | 12/1996 | Thompson .............................. 407/119 |
| 5,620,285 | 4/1997 | Turchan .................................. 409/132 |

FOREIGN PATENT DOCUMENTS

| | | |
|---|---|---|
| A-160096 | 11/1985 | European Pat. Off. . |
| C-4316411 | 5/1994 | Germany . |
| 56-72104 | 6/1981 | Japan . |
| 1-36760 | 2/1989 | Japan . |
| 1404201 | 6/1988 | Russian Federation ............... 409/132 |

OTHER PUBLICATIONS

Chun–Fong You, et al. "An automatic path generation method of NC rough cut machining from solid models", Computers In Industry, vol. 26, No. 2, May 1995, Amsterdam, NL, pp. 161–173.

*Primary Examiner*—Daniel W. Howell
*Attorney, Agent, or Firm*—Griffin, Butler, Whisenhunt & Szipl, LLP

[57] ABSTRACT

There is provided a method of three-dimensionally cutting a mold including the steps, in sequence, of (a) rotating a single ball end mill at a rate in the range of 50,000 rpm to 200,000 rpm, the ball end mill being made of material having high thermal resistance, (b) driving the ball end mill in horizontal, reciprocating movement at a rate in the range of 10 m/min to 100 m/min, and driving the ball end mill in transverse movement at a predetermined depth of cut in a direction perpendicular to a direction in which the ball end mill is reciprocated, at opposite ends of the reciprocating movement to cut a workpiece in a surface thereof at a common depth of cut, and (c) vertically feeding the ball end mill at a predetermined depth of cut. This method makes it possible to significantly increase a rotation speed and a feeding speed of a cutting tool to thereby remarkably reduce time necessary for cutting a mold.

11 Claims, 5 Drawing Sheets

METHOD OF HIGH SPEED CUTTING MOLD AND ULTRA-HIGH SPEED MILLING MACHINE

BACKGROUND OF THE INVENTION

1. Field of the Invention

The invention relates to a method of cutting a mold at high speed, and also to an ultra-high speed milling machine for carrying out the method.

2. Description of the Related Art

Most mechanical parts are manufactured by using molds, and now such molds are indispensable to mass produce high quality mechanical parts at lower costs. Conventionally, it has taken much time and much cost to manufacture a mold. However, as it becomes trendy to produce just a the small number of industrial parts and product life cycles become shorter, there is a strong demand to shorten the period of time for fabricating a mold and to lower the cost of fabrication.

In general, the manufacturing of a mold includes steps, in sequence, of designing, cutting, assembling and finishing, trial and modification. Among these steps, it is presently possible to complete designing in a relatively short period of time because of the development of computer aided (design (CAD) and forming simulation. At present, it takes the longest time to make numerical control programming for manufacturing a mold, and manufacturing of the mold itself.

Mold manufacturing is mostly accomplished by milling by means of an end mill. However, it is impossible to use a large diameter cutting tool for manufacturing of a mold having a complicated shape, except for rough machining. Thus, in most cases, mold manufacturing is accomplished by light-cutting using a small diameter cutting tool. This poses a problem that the depth of cut has to be small, and hence, the machining takes too much time. In order to shorten the time for cutting, it is necessary to increase a rotation speed and hence a feeding speed of the cutting tool. However, a conventional cutting process has many problems for doing so as follows: (a) short lifetime of the cutting tool, (b) difficulty in rotating the tool at a high speed, (c) durability of the bearing, (d) accuracy of a tool holder, (e) mechanism for feeding a cutting tool at a high speed, (f) design of an numerical control (NC) tape, (g) thermal deformation of a processing machine, (h) generation of surface steps of a workpiece due to exchanging tools, and (i) damage to tools due to unexpected increase in depth of cut.

Hereinbelow, the above-mentioned problems are detailed.

If a cutting tool is rotated and fed at a high speed, the lifetime of the tool is made shorter, and thus it will be necessary to frequently exchange tools. As a result, it is impossible to carry out high speed machining.

Though a conventional rotation speed of a tool is smaller than a few thousand rounds per minute (rpm), it is required to increase the rotation speed beyond a few ten thousand rounds per minute.

A conventional ball bearing is able to withstand rotation speed ranging from 10,000 rpm to 50,000 rpm, but is practically unable to withstand a greater rotation speed, because it would have just a short duration o)f life under such rotation speed.

When rotated at a speed greater than a few tens of thousands of rounds per minute, a conventional tool holder would have a problem of loosening and dynamic balance due to centrifugal force in clamps between which a tool is to be clamped.

High speed feeding is indispensable for high efficiency manufacturing, but a conventional ball screw has an upper limit in the range of 20 m/min to 60 m/min. In addition, acceleration and deceleration performances are quite important for high speed feeding, but the driver and/or controller cannot avoid to becoming larger in size in order to make it possible to accelerate or decelerate a ball screw at a short period of time.

It takes much time to make a numerical control tape even now. In particular, for a conventional triaxial control, it takes too much time to make a numerical control tape in order to carry out cutting on a workpiece at a smaller pitch.

If high speed rotation and feeding are carried out, generated heat from a shaft driven at high speed and generated heat during cutting of a workpiece causes the milling machine to be thermally deformed. In particular, such thermal deformation cannot be disregarded in fabricating a mold which has to be accurately dimensioned.

By exchanging tools, a step may be produced on a cutting plane of a workpiece due to dislocation of a newly set tool, elastic deformation of a tool and dispersion in dimension of tools, with the result of the generation of error in surface accuracy.

In general, rough machining and then finish machining have been conventionally carried out to thereby enhance manufacturing efficiency. However, depth of cut often becomes too deep in finishing subsequently to rough machining, and thus the finishing tool is damaged.

SUMMARY OF THE INVENTION

The present invention was made to solve the above-mentioned problems in prior art. Namely, it is an object of the present invention to provide a method of cutting a mold at high speed and a ultra-high speed milling machine to which the method is applied both of which are capable of significantly increasing rotation and feeding speeds of the cutting tool to thereby remarkably shorten the period of time necessary for fabricating a mold by cutting.

The inventors repeated experiments and found out the fact that a highly densified, sintered cutting tool made of cubic system boron nitride (hereinafter, referred to simply as "cBN") is suitable for milling ferrous metals of which a mold is to be made at ultra-high speed, and can have a longer duration of life at higher speed range. The present invention utilizes such novel, unique characteristic of a cBN made tool, and solves the above-mentioned problems by using a single small diameter tool made of material having high thermal resistance, and rotating and feeding the tool at a high speed.

Specifically, in one aspect, the present invention provides a method of three-dimensionally cutting a mold including the steps, in sequence, of (a) rotating a single ball end mill at a rate in the range of 50,000 rpm to 200,000 rpm, the ball end mill being made of material having high thermal resistance, (b) driving the ball end mill in horizontal, reciprocating movement at a rate in the range of 10 m/min to 100 m/min, and driving the ball end mill in transverse movement at a predetermined depth of cut in a direction perpendicular to a direction in which the ball end mill is reciprocated, at opposite ends of the reciprocating movement to cut a workpiece in a surface thereof at a common depth of cut, and (c) vertically feeding the ball end mill at a predetermined depth of cut.

In accordance with the above-mentioned method, it is possible to manufacture a mold having a complicated shape or small rounded corners by rotating a single ball end mill made of highly thermally resistant material at a speed in the range of 50,000 rpm to 200,000 rpm. It is also possible to cut a surface of a workpiece at a high speed and with high efficiency by driving the ball end mill in horizontal, reciprocating movement at a speed in the range of 10 m/min to 100 m/min.

In the present method, a surface of a workpiece is cut at common depth of cut by driving the ball end mill in reciprocating movement at a high speed, and then the ball end mill is vertically fed at a predetermined depth of cut. Thus, a workpiece is cut with the depth of cut established by the ball end mill being kept almost constant. Hence, it is relatively easy to keep cutting conditions optimal, and it is possible to make the lifetime of the ball end mill longer.

Since the ball end mill is driven at a high speed only in reciprocating movement, a numerical control (NC) program can be simplified, and hence it is possible to carry out NC control in real-time with data being produced by means of a computer. Since the production of NC program presently takes a significantly long time, the remarkable reduction in NC program production time contributes to the reduction in time necessary for manufacturing of the mold.

Since only a single ball end mill is to be used in the present method, problems of dislocation of the ball end mill caused by exchanging tools and dispersion in the dimension of tools do not arise. In addition, a workpiece is cut for every surface thereof by a single mill without distinguishing, rough and finish cutting. Thus, there does not occur a drastic change in depth of cut which would be caused by large residue which was not cut in rough cutting, and hence it is relatively easy to keep the depth of cut constant. Furthermore, the cutting tool is less likely to be damaged. It is also possible to avoid the cutting tool from being damaged due to dispersion in depth of cut caused by misprogramming in NC control.

In a preferred embodiment, before the step (b) of driving said ball end mill in horizontal, reciprocating movement and transverse movement at a predetermined depth of cut, the method further includes the step (d) of driving said ball end mill in horizontal, along a contour line at a relatively slow rate at the predetermined depth of cut.

According to the present method, since the ball end mill is driven in horizontal, along a contour line at a relatively slow rate, it is easy to follow the movement to the NC program data and also simple and easy to produce the NC program data automatically at a real-time.

It is difficult to drive the ball end mill at a high speed only in reciprocating movement because the first feed is groove cutting and the tool load is big. However according to the present method, since the method comprises the step (d) of driving the ball end mill along a contour line at the predetermined depth of cut before the step (b) of high speed feeding, the tool load of high speed feeding can be extremely reduced.

Since the ball end mill is fed along a contour line, roughness along the circumferential wall becomes better. Furthermore since the over-run by the high speed feed can be neglected, the influence of the tool position error disappears.

In another aspect, the present invention provides a ultra-high speed milling machine to be used for three-dimensionally cutting a mold, including (a) a single ball end mill made of material having high thermal resistance, (b) a driver for rotating the ball end mill at a rate in the range of 50,000 rpm to 200,000 rpm, (c) a bearing for supporting the ball end mill therewith, (d) a triaxial driver for feeding the ball end mill in X, Y and Z axes, and (e) a controller for numerically controlling the triaxial driver. The triaxial driver drives the ball end mill in reciprocating movement only in an X-axis direction at a rate in the range of 10 m/min to 100 m/min. The controller controls the triaxial driver so that the ball end mill is driven in reciprocating movement in an X-axis direction, transversely fed at a predetermined depth of cut in a Y-axis direction at opposite ends of the reciprocating movement to cut a workpiece in a plane thereof at a common depth of cut, and then vertically fed at a predetermined depth of cut in a Z-axis direction.

In a preferred embodiment, the reciprocating movement of the ball end mill in an X-axis direction is accomplished by a linear motor. The driver for rotating the ball end mill is preferably a high frequency motor.

The ball end mill may be made of material other than material having high thermal resistance. For instance, the ball end mill may be coated with heat-resistant material. As an alternative, the ball end mill may be made of cubic system boron nitride (cBN). It is also preferable that the ball (end mill is made of a ultra-hard alloy substrate on which multi-layered ceramic coatings are applied.

The bearing for supporting the ball end mill mast be selected from a pneumatic bearing and a magnetic bearing.

The controller may be preferably driven by a program for scanning light beams in laser stereo lithography.

In accordance with the above-mentioned ultra-high speed milling machine, a workpiece is cut with depth of cut being kept constant by rotating the ball end mill at a high speed. Thus, it is possible to carry out high-speed cutting even if depth of cut is set to be small. In addition, since the load acting on the ball end mill can be kept small, there can be accomplished support of the ball end mill with a high-speed bearing and high-speed rotation of the ball (end mill by means of a high frequency motor.

Since only a single ball end mill is to be used in the ultra-high speed milling machine without exchanging to other mills, it is possible to use a light-weight and small-sized tool holder, and thus avoid problems that clamp sections of a tool holder between which the ball end mill to be clamped become loosened and the dynamic balance of the ball end mill gets out of order due to centrifugal force.

Since the ball end mill is driven in reciprocating movement at a high speed only in the X-axis direction, it is possible to enhance high speed feeding and acceleration/deceleration characteristics, and hence rapidly accomplish acceleration/deceleration by means of a relatively small-sized driver by making a head light in weight which rotates the ball end mill.

Since the ball end mill is driven at a high speed only in reciprocating movement, a numerical control (NC) program can be simplified even if the feeding pitch of the ball end mill is set to be small, and hence it is possible to carry out NC control in real-time with data being produced by means of a computer.

The ball end mill is continued to be rotated and fed at a high speed for a long time without being exchanged to other mills, and hence an almost constant amount of heat is generated during operation of the ball end mill with the result of saturation in thermal balance, contributing to more stable cutting. In addition, since only a single ball end mill is to be used in the method, problems of dislocation of a ball end mill accompanied with exchanging tools and dispersion in dimension of tools do not arise. Furthermore, every surface of a workpiece is cut for by a single mill without distinguishing rough and finish cutting. Thus, there does not occur any drastic change in depth of cut which would be caused by large residue which was not cut in rough cutting, and hence it is relatively easy to keep the depth of cut constant, and the ball end mill is less likely to be damaged.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

The basic principle of the present invention and preferred embodiments in accordance with the present invention will be explained hereinbelow with reference to drawings.

Figure 1:
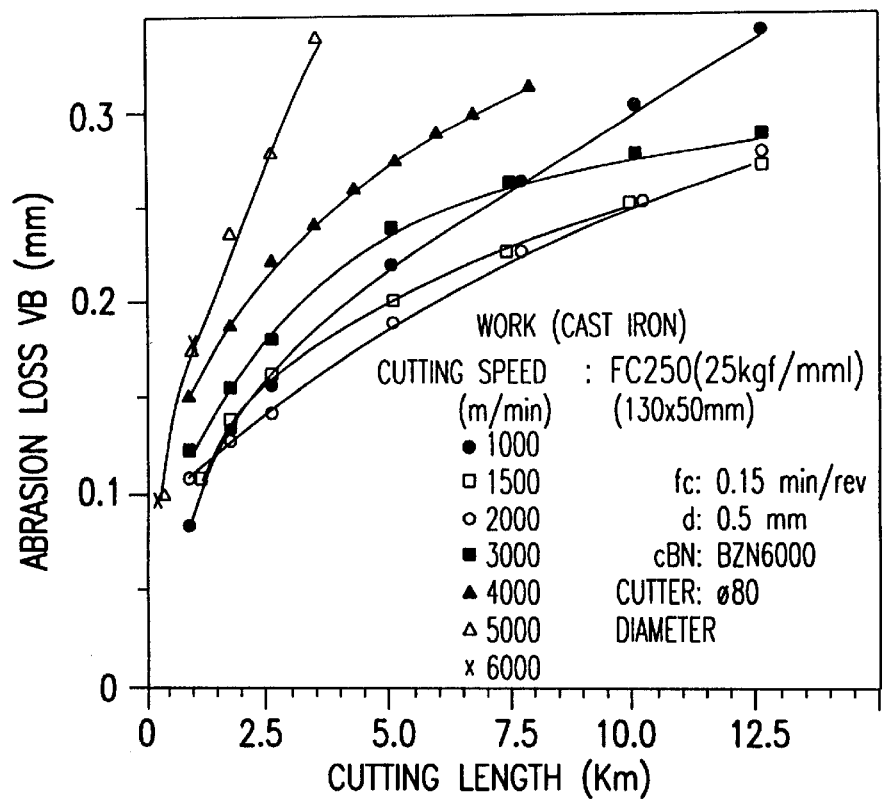
FIG. 1 is a graph showing the relation between cutting length and abrasion loss when a cutting speed is varied.
Figure 2:
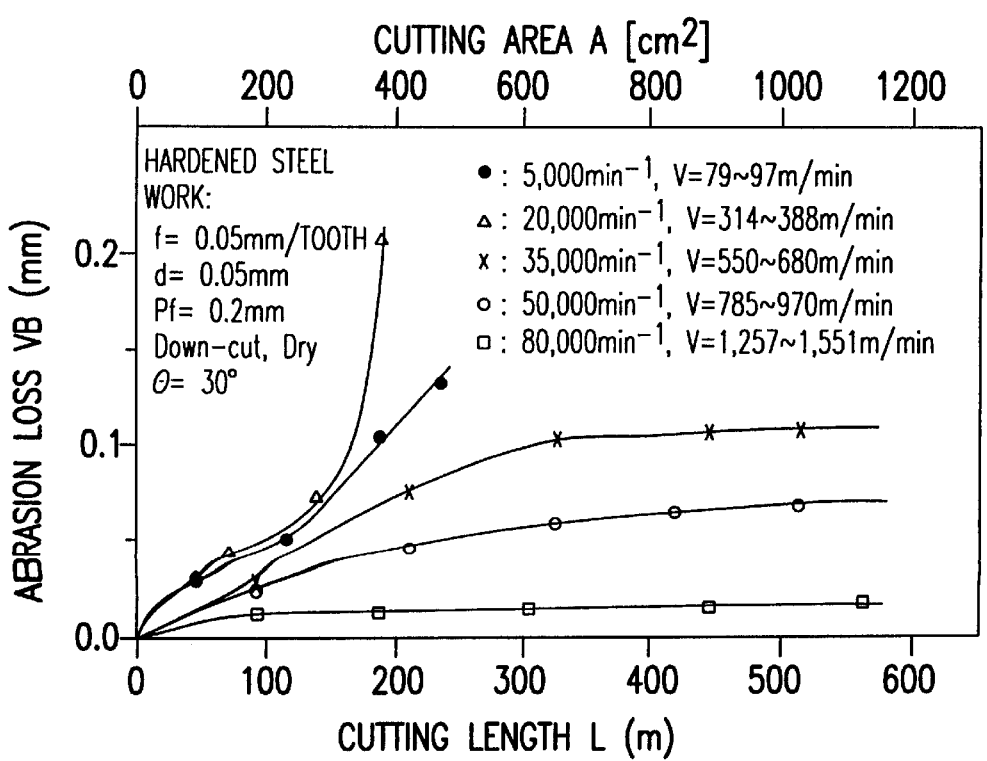
FIG. 2 is a graph showing the relation between cutting length and abrasion loss when a rotation speed of a tool is varied.

FIGS. 1 and 2 show the results of experiments conducted by the inventors, specifically the results obtained when a work made of an iron family metal is milled at an ultra-high speed by means of a highly densified, sintered cutting tool made of cubic system boron nitride (cBN).

FIG. 1 shows the relation between cutting length and abrasion loss when a cutting speed is varied. A conventional cutting speed in milling is in the range of 200 m/min to 500 m/min. It will be understood in view of FIG. 1 that the experiments were conducted at a speed five times to ten times greater than a conventional cutting speed. The unique characteristic shown in FIG. 1 is that the greater the cutting speed is, the less the abrasion loss is at a speed in the range of 1000 m/min to 3000 m/min. In other words, a cutting tool can have a longer duration of life at a higher cutting speed.

FIG. 2 shows the relation between cutting length and abrasion loss when a rotation speed of a tool or ball end mill is varied. A conventional rotation speed of a ball end mill in milling is in the range of 3,000 rpm to 4,000 rpm. The experiments were conducted at a speed five times to twenty times greater than a conventional rotation speed. The characteristic shown in FIG. 2 is that the greater the cutting speed is, the less the abrasion loss is at a speed equal to or greater than 35,000 rpm, similarly to FIG. 1.

Thus, it is understood in view of the results shown in FIGS. 1 and 2 that the above-mentioned problems in prior art can be solved, and hence ultra-high speed milling can be accomplished by using a single cutting tool made of cBN and rotating/feeding the tool at a high speed. As an alternative to the cutting tool made of cBN, there may be used a cutting tool coated with heat resistant material.

Figure 3:
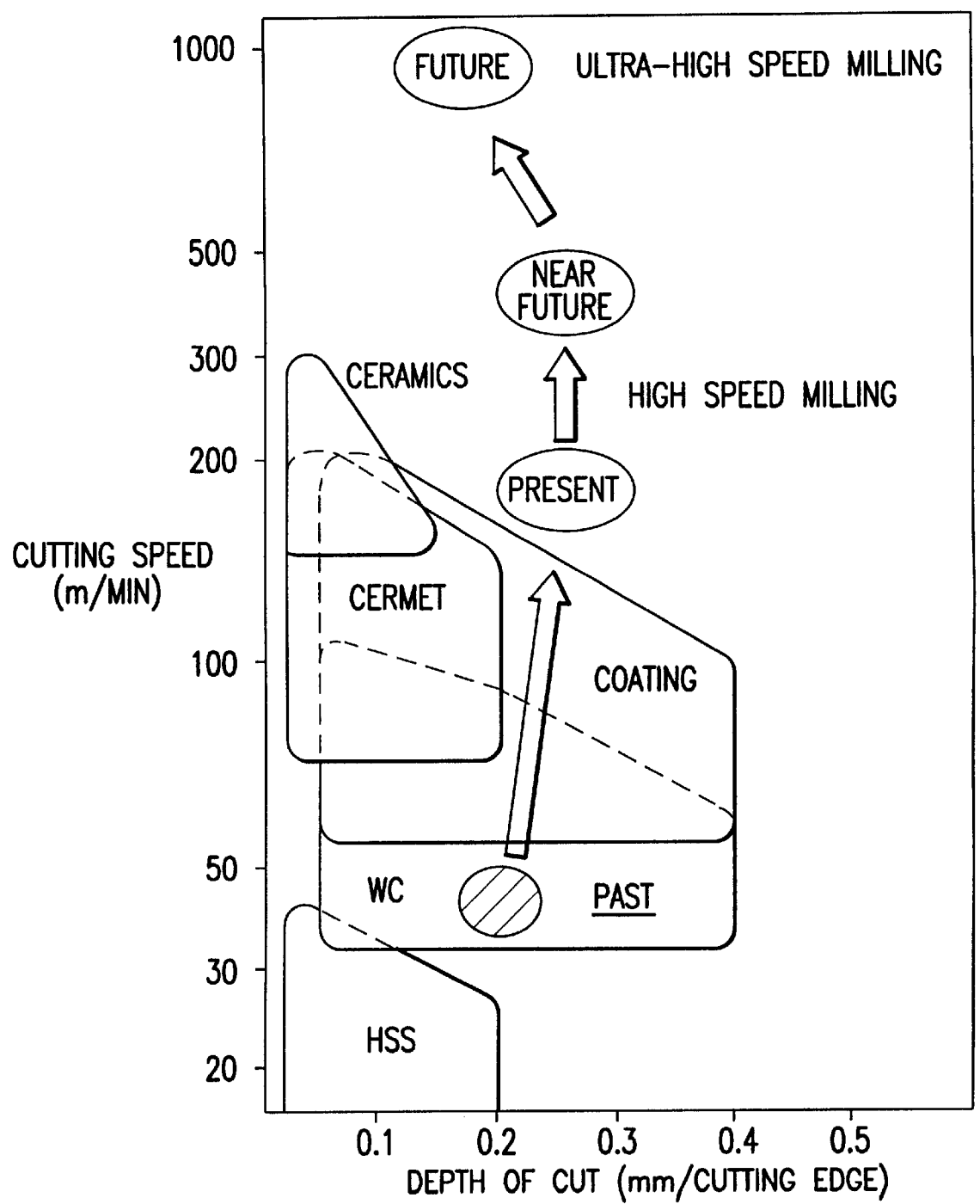
FIG. 3 is a schematic view showing the future prediction of milling.

FIG. 3 shows the future prediction of milling. The milling to be used for manufacturing of a mold has been developed, and hence, though the conventional cutting speed is merely in the range of 30 m/min to 50 m/min, the present cutting speed is improved to about 200 m/min. On the other hand, the depth of cut is slightly increased in contrast with the significant improvement in the cutting speed.

It is expected that the development in the art will increase the cutting speed up to the range from 400 m/min to 500 m/min in the near future, and up to about 1000 m/min in the future. It is also expected that the depth of cut will be made smaller due to necessity in more accurate cutting. The present invention provides a method and an apparatus for accomplishing ultra-high speed milling under the above-mentioned prediction.

Figure 4:
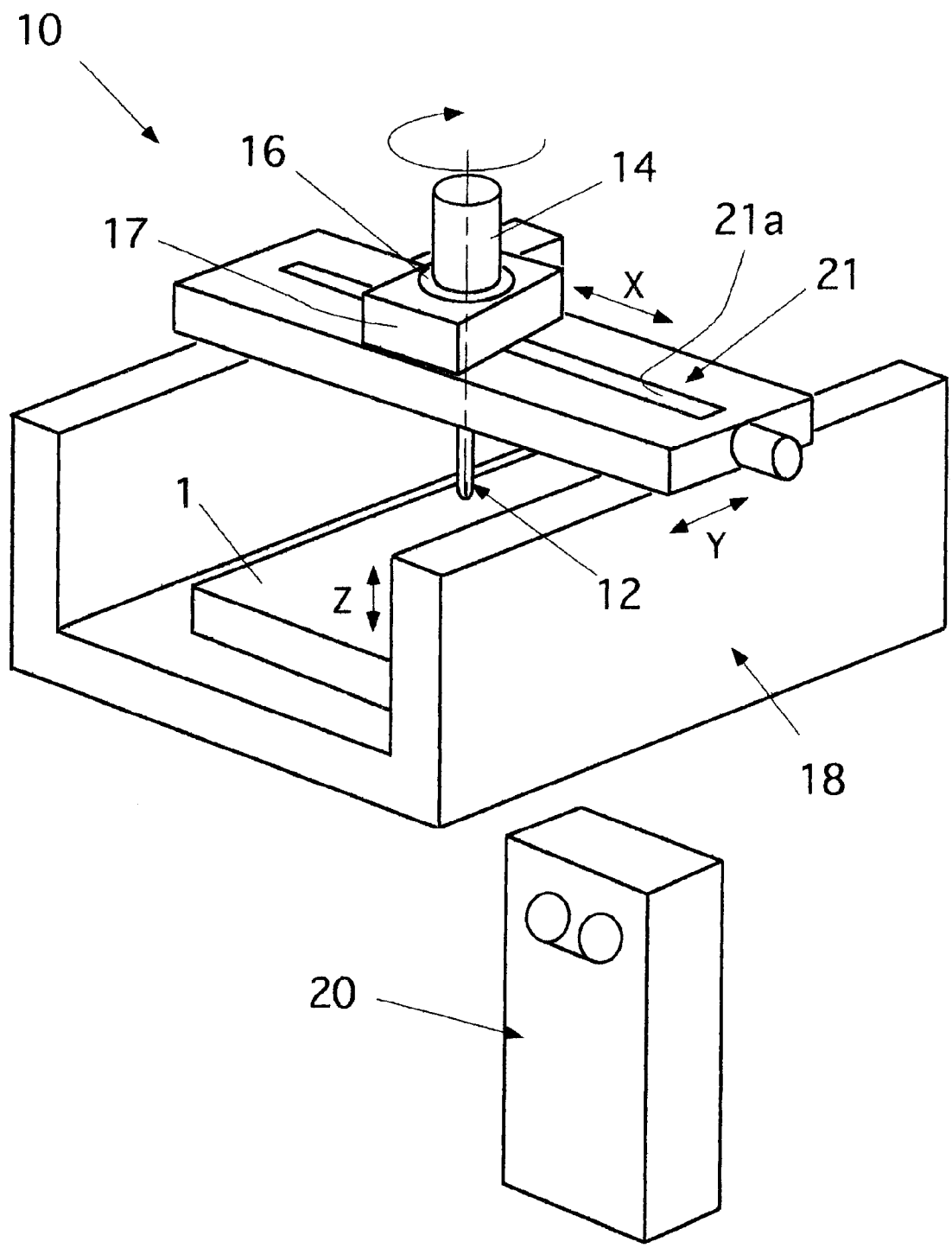
FIG. 4 is a perspective view illustrating a ultra-high speed milling machine to which the method in accordance with the present invention is applied.

FIG. 4 illustrates a ultra-high speed milling machine to which the method in accordance with the present invention is applied. The illustrated milling machine 10 includes a single small-diameter ball end mill 12 made of material having high thermal resistance, a high frequency motor 14 for rotating the ball end mill 12 at a rate in the range of 50,000 rpm to 200,000 rpm, a high speed bearing 16 for supporting the ball end mill 12 rotating, at a high speed, a triaxial driver 18 for feeding the ball end mill 12 in X and Y axes perpendicular to each other in a horizontal plane and an Z axis vertical to the X and Y axes, and a numerical control (NC) apparatus 20 for numerically controlling the triaxial driver 18. The ball end mill 12 is set to cut a work 1 disposed therebelow. The triaxial driver 18 drives the ball end mill 12 in a Z-axis direction either by vertically moving a table on which the work 1 is placed or by vertically moving a slider 21 which slides the ball end mill 12 in an X-axis direction.

The ball end mill 12 is made of highly densified, sintered cubic system boron nitride (cBN). The cubic system boron nitride considered as new material of which a cutting tool is to be made has high heat resistance and tenacity, and has a small rate with respect to occurrence of chipping. In accordance with the above mentioned experiments in which a ball end mill made of highly densified cBN was used, the ball end mill 12 enables ultra-high speed milling at a speed in the range of 1000 m/min to 1500 m/min for die steel, and in the range of 2000 m /min to 3000 m /min for cast iron.

It should be noted that the ball end mill 12 may be made of any material other than cBN, if it has high thermal resistance. For instance, the ball end mill 12 may be made of a ultra-hard alloy substrate on which multi-layered ceramic coatings are applied, or of ceramic.

In the illustrated the ultra-high speed milling machine, the ball end mill 12 is designed to rotate around a Z-axis, and is carried at a support block 17 through the high-speed bearing 16. The support block 17 is designed to slide along a slit 21a formed with the slider 21 at a high speed in reciprocating manner in an X-axis direction. A ball end mill having a tip end having a diameter in the range of about 2 mm to about 10 mm is most suitable for surface finish of a mold. It is required for the ball end mill 12 to rotate at a speed in the range of 50,000 rpm to 200,000 rpm in order to accomplish the above-mentioned high cutting speed. To this end, the ultra-high speed milling machine uses the high frequency motor 14 and a pneumatic bearing as the high speed bearing 16. Since the ultra-high speed milling machine rotates the ball end mill 12 at a high rate, the depth of cut per cutting is quite small with the result of small cutting resistance.

Hence, the support of the ball end mill 12 with the pneumatic bearing 16 and the high speed rotation of the ball end mill 12 by means of the high frequency motor 14 can be accomplished. As an alternative to the pneumatic bearing 16, there may be used a magnetic bearing or a high speed type ball bearing using a ceramic.

The triaxial driver 18 is designed to be able to drive the ball end mill 12 in reciprocating movement only in an X-axis direction at a rat(e in the range of 10 m/min to 100 m/min. In order to accomplish rapid acceleration/deceleration of the ball end mill 12 by high speed feeding of a main shaft and further accurately position the ball end mill 12, it is necessary to lighten a movable portion of the main shaft. Thus, in the ultra-high speed milling machine, only one (X-axis) of the three axes is designed to be fed at a high speed, and the other two axes (Y- and Z-axes) at a low speed.

In FIG. 4, the triaxial driver 18 is of a gantry type. However, the triaxial driver 18 is not to be limited to gantry type, but may be of other types regardless of longitudinal or cross-longitudinal arrangement. The reciprocating movement of the ball end mill 12 in an X-axis direction is carried out by a ball screw, but preferably by a linear motor.

The ultra-high speed milling machine made in accordance with the embodiment makes it possible to improve high speed feeding and acceleration/deceleration characteristics, and thus rapid acceleration/deceleration can be accomplished by a relatively small driver. Since the cutting resistance is small, a high speed feeding axis (X-axis) can be lightened, even if the X-axis is slightly reduced in stiffness by lightening. Thus, there can be accomplished both of high speed cutting and lightening the milling machine, which contributes lower costs.

Figure 5A:
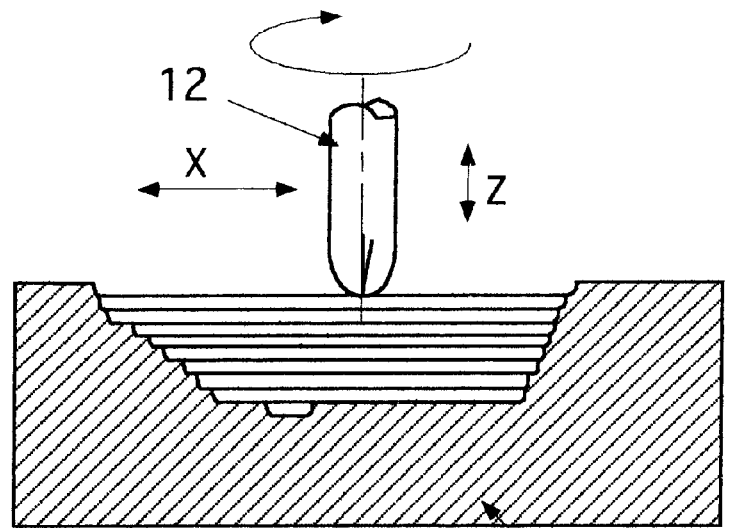
FIGS. 5A, 5B, and 5C are schematic views showing how the method in accordance with the present invention is reduced to practice.
Figure 5B:
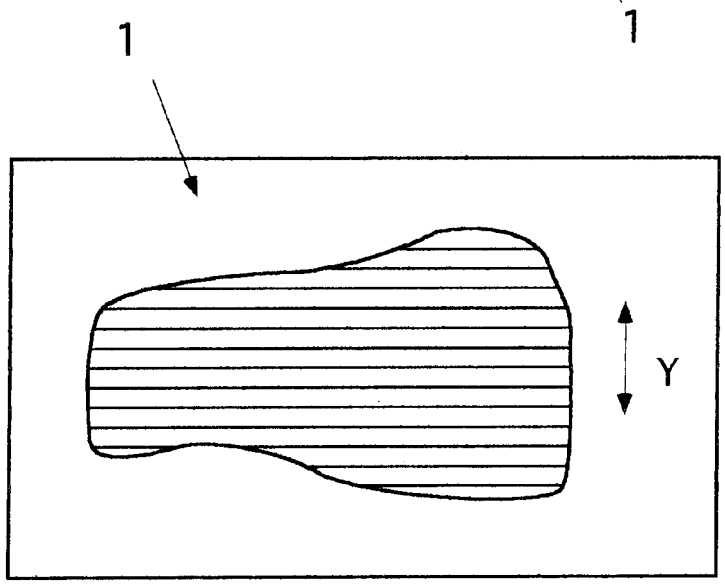
Figure 5C:
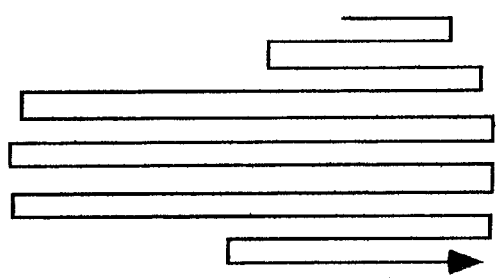

FIGS. 5A to 5C shows how the method in accordance with the present invention is reduced to practice. FIG. 5A is a cross-sectional side view illustrating the movement of the ball end mill 12 against the work 1 in X- and Z-axes directions, FIG. 5B is a plan view illustrating the movement of the ball end mill 12 against the work 1 in X- and Y-axes directions, and FIG. 5C schematically illustrates a locus of the ball end mill 12 in a common plane.

In accordance with the present method, as the single small-diameter ball end mill 12 made of highly thermal resistant material is being rotated at a rate in the range of 50,000 rpm to 200,000 rpm, the ball end mill 12 is first driven in horizontal, reciprocating movement at a rate in the range of 10 m/min to 100 m/min. Further, the ball end mill 12 is driven in transverse movement at a predetermined depth of cut in a direction perpendicular to a direction in which the ball end mill 12 is driven in reciprocating movement, at opposite ends of the reciprocating movement of the ball end mill 12 to thereby cut a workpiece in a surface thereof at a common depth of cut. Then, the ball end mill 12 is vertically fed into the workpiece at a predetermined depth of cut. Thus, the workpiece is three-dimensionally cut by high speed rotation and high speed reciprocating movement of the single small-diameter ball end mill 12.

Namely, the NC apparatus 20 controls the triaxial driver 18 in such a way that the ball end mill 12 is driven at a high speed in reciprocating movement in an X-axis direction, and transversely fed at a predetermined depth of cut in a Y-axis direction at opposite ends of the reciprocating movement to thereby cut a workpiece in a plane thereof at a common depth of cut, then vertically fed at a predetermined depth of cut in a Z-axis direction. Cutting debris generated during cutting is powder-like, and hence can be vacuum-sucked or blown away by an air blower.

The above-mentioned steps correspond to that NC data of cutting covers a surface of a workpiece to be cut by a uniaxial reciprocation. This is just the same as a program for scanning with light beams in laser stereo lithography, and hence the program can be utilized in the present method as it is. In addition, it is possible to obtain NC data of cutting in real-time directly from three dimensional CAD data of a surface of a workpiece to be cut. Accordingly, the present invention makes it possible to significantly reduce the time necessary for obtaining NC data, and overcomes the problem of much increasing NC data.

In the method in accordance with the present invention, since all surfaces of a mold are cut with only a single ball end mill, no errors are generated due to exchanging ball end mills, and it is almost possible to overcome the problem of inaccuracy caused by thermal deformation of the milling machine. Even if a single ball end mill is to be used, holes formed with a mold can be formed by helical feeding of a ball end mill.

Figure 6A:
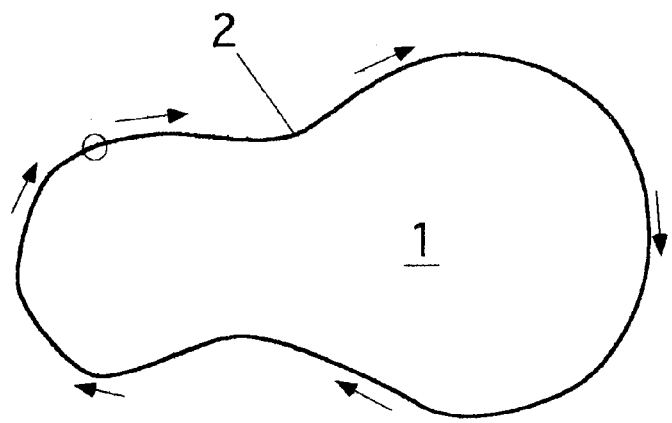
FIGS. 6A and 6B are other schematic views showing how the method in accordance with the present invention is reduced to practice.
Figure 6B:
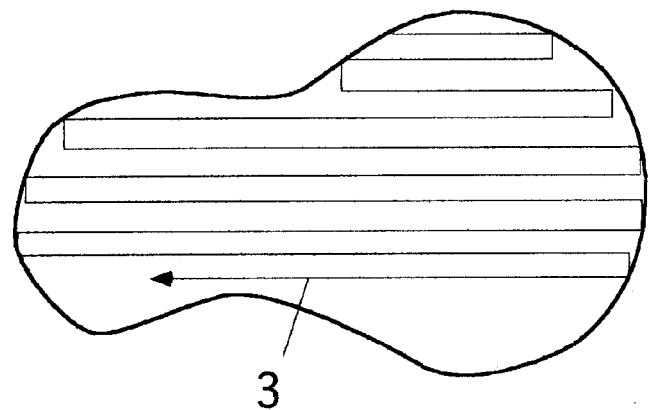

FIGS. 6A to 6C shows another embodiment of the method in accordance with the present invention. In this embodiment, before driving the ball end mill 12 in horizontal, reciprocating movement and transverse movement at a predetermined depth of cut, as shown in FIG. 5C, the method comprising the step of driving the ball end mill 12 in horizontal, along a contour line 2 at a relatively slow rate at the predetermined depth of cut. After that, high speed reciprocating movement and transverse movement are performed. Other steps are same with FIGS. 5A to 5C.

According to the method, since the ball end mill is driven in horizontal, along a contour line 2 at a relatively slow rate, it is easy to follow the movement to the NC program data and also simple and easy to produce the NC program data automatically in real-time.

Figure 7A:
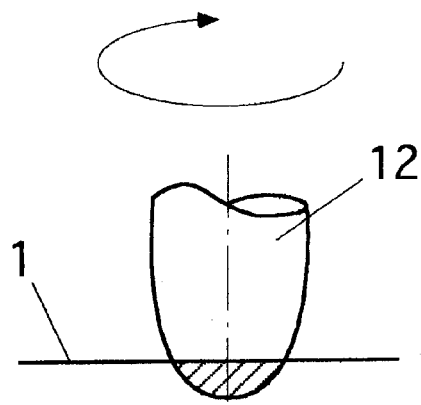
FIGS. 7A and 7B are schematic views showing cutting areas by a ball end mill.
Figure 7B:
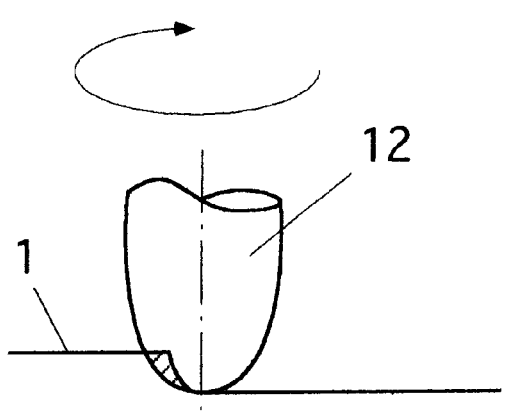

It is difficult to drive the ball end mill 12 at a high speed only in reciprocating movement because the first feed is groove cutting as shown in FIG. 7A and the tool load is big. However according to the method, since the method comprises the step of driving the ball end mill 12 along a contour line 2 at the predetermined depth of cut before the high speed feeding 3, the tool load of high speed feeding 3 can be extremely reduced as shown in FIG. 7B.

Since the ball end mill 12 is fed along a contour line 2, roughness along the circumferential wall becomes better. Further since the over-run by the high speed feed can be neglect, the influence of the tool position error disappears.

As mentioned so far, the method of cutting a mold at high speed and the ultra-high speed milling machine to which the method is applied are capable of solving the problems of the prior method, and of significantly increasing rotation and feeding speeds of the cutting tool to thereby remarkably shorten the period of time necessary for fabricating a mold, contributing to reduction of lead time for manufacturing of the mold and development of new articles, and also to reduction in mold manufacturing cost and enhancement in accuracy of a mold.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method of three-dimensionally cutting a mold comprising the steps, in sequence, of:

(a) rotating a single ball end mill at a rate in the range of 50,000 rpm to 200,000 rpm, said ball end mill being made of material having high thermal resistance;

(b) driving said ball end mill in horizontal, reciprocating movement at a rate in the range of 10 m/min to 100 m/min, and driving said ball end mill in transverse movement at a predetermined depth of cut in a direction perpendicular to a direction in which said ball end mill is reciprocated, at opposite ends of said reciprocating movement to cut a workpiece in a surface thereof at a common depth of cut; and (c) vertically feeding said ball end mill at a predetermined depth of cut.

2. The method of three-dimensionally cutting a mold as set forth in claim 1, wherein before the step (b) of driving said ball end mill in horizontal, reciprocating movement and transverse movement at a predetermined depth of cut, comprising the step (d) of driving said ball end mill in the horizontal and transverse directions, along a contour line at a relatively slow rate at the predetermined depth of cut.

3. A ultra-high speed milling machine to be used for three-dimensionally cutting a mold, comprising:

(a) a single ball end mill made of material having high thermal resistance;

(b) means for rotating said ball end mill at a rate in the range of 50,000 rpm to 200,000 rpm;

(c) a bearing for supporting said ball end mill therewith;

(d) a triaxial driver for feeding said ball end mill in X, Y and Z axes; and (e) a controller for numerically controlling said triaxial driver; and said triaxial driver driving said ball end mill in reciprocating movement only in an X-axis direction at a rate in the range of 10 m/min to 100 m/min;

said controller controlling said triaxial driver so that said ball end mill is driven in reciprocating movement in an X-axis direction, transversely fed at a predetermined depth of cut in a Y-axis direction at opposite ends of said reciprocating movement to cut a workpiece in a plane at a common depth of cut, and then vertically fed at a predetermined depth of cut in a Z-axis direction.

4. The ultra-high speed milling machine as set forth in claim 3, wherein said reciprocating movement of said ball end mill in an X-axis direction is accomplished by a linear motor.

5. The ultra-high speed milling machine as set forth in claim 3, wherein said means for rotating said ball end mill is a high frequency motor.

6. The ultra-high speed milling machine as set forth in claim 3, wherein said ball end mill is coated with heat-resistant material.

7. The ultra-high speed milling machine as set forth in claim 3, wherein said ball end mill is made of cubic system boron nitride (cBN).

8. The ultra-high speed milling machine as set forth in claim 3, wherein said ball end mill is made of a ultra-hard alloy substrate on which multi-layered ceramic coatings are applied.

9. The ultra-high speed milling machine as set forth in claim 3, wherein said bearing is a pneumatic bearing.

10. The ultra-high speed milling machine as set forth in claim 3, wherein said bearing is a magnetic bearing.

11. The ultra-high speed milling machine as set forth in claim 3, wherein said single ball end mill is made of cubic system boron nitride.

* * * * *